United States Patent
Smuga et al.

(10) Patent No.: US 7,712,022 B2
(45) Date of Patent: May 4, 2010

(54) MUTUALLY EXCLUSIVE OPTIONS IN ELECTRONIC FORMS

(75) Inventors: Michael A Smuga, Seattle, WA (US); Alessandro Catorcini, Redmond, WA (US); Scott M. Roberts, Bothell, WA (US); Willson Kulandai Raj David, Woodinville, WA (US); Andrew Paul Begun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 10/988,720

(22) Filed: Nov. 15, 2004

(65) Prior Publication Data

US 2006/0107252 A1    May 18, 2006

(51) Int. Cl.
G06F 17/20 (2006.01)
G06F 17/21 (2006.01)

(52) U.S. Cl. .................. 715/221; 715/224; 715/234; 715/237

(58) Field of Classification Search .......... 715/503, 715/504, 517, 203, 204, 221, 226, 273, 234, 715/237, 224
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,926,476 A | 5/1990 | Covey | |
| 4,933,880 A | 6/1990 | Borgendal et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,140,563 A * | 8/1992 | Thinesen ............ | 368/70 |
| 5,179,703 A | 1/1993 | Evans | |
| 5,182,709 A | 1/1993 | Makus | |
| 5,187,786 A | 2/1993 | Densmore et al. | |

(Continued)

FOREIGN PATENT DOCUMENTS

EP     0841615     11/1999

(Continued)

OTHER PUBLICATIONS

Microsoft Visual Basic 5.0 Programmer's Guide, Microsoft Press, © 1997, pp. 42, 43, and 54-58.*

(Continued)

*Primary Examiner*—Laurie Ries
*Assistant Examiner*—Chau Nguyen

(57) ABSTRACT

Systems and methods enabling creation and/or use of an electronic form capable of allowing a user to select from mutually exclusive options without the electronic form being in an invalid state are described. One of the described electronic forms remains valid to its schema by atomic swapping of data substructures corresponding to the form's mutually exclusive options. A method and a user interface for creating some of these electronic forms are also described.

16 Claims, 9 Drawing Sheets

U.S. PATENT DOCUMENTS

| | | | |
|---|---|---|---|
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,220,649 A | 6/1993 | Forcier | |
| 5,222,160 A | 6/1993 | Sakai et al. | |
| 5,228,100 A | 7/1993 | Takeda et al. | |
| 5,237,680 A | 8/1993 | Adams et al. | |
| 5,249,275 A | 9/1993 | Srivastava | |
| 5,251,273 A | 10/1993 | Betts et al. | |
| 5,274,803 A | 12/1993 | Dubin et al. | |
| 5,297,249 A | 3/1994 | Bernstein et al. | |
| 5,297,283 A | 3/1994 | Kelly, Jr. et al. | |
| 5,313,631 A | 5/1994 | Kao | |
| 5,313,646 A | 5/1994 | Hendricks et al. | |
| 5,317,686 A | 5/1994 | Salas et al. | |
| 5,333,317 A | 7/1994 | Dann | |
| 5,339,423 A | 8/1994 | Beitel et al. | |
| 5,339,424 A | 8/1994 | Fushimi | |
| 5,341,478 A | 8/1994 | Travis, Jr. et al. | |
| 5,369,766 A | 11/1994 | Nakano et al. | |
| 5,369,778 A | 11/1994 | San Soucie et al. | |
| 5,371,675 A | 12/1994 | Greif et al. | |
| 5,377,323 A | 12/1994 | Vasudevan | |
| 5,379,419 A | 1/1995 | Heffeman et al. | |
| 5,381,547 A | 1/1995 | Flug et al. | |
| 5,390,325 A | 2/1995 | Miller | |
| 5,396,623 A | 3/1995 | McCall et al. | |
| 5,408,665 A | 4/1995 | Fitzgerald | |
| 5,410,646 A | 4/1995 | Tondevold et al. | |
| 5,410,688 A | 4/1995 | Williams et al. | |
| 5,412,772 A | 5/1995 | Monson | |
| 5,434,975 A | 7/1995 | Allen | |
| 5,436,637 A | 7/1995 | Gayraud et al. | |
| 5,438,659 A * | 8/1995 | Notess et al. | 715/505 |
| 5,440,744 A | 8/1995 | Jacobson et al. | |
| 5,446,842 A | 8/1995 | Schaeffer et al. | |
| 5,455,875 A | 10/1995 | Chevion et al. | |
| 5,459,865 A | 10/1995 | Heninger et al. | |
| 5,481,722 A | 1/1996 | Skinner | |
| 5,497,489 A | 3/1996 | Menne | |
| 5,504,898 A | 4/1996 | Klein | |
| 5,517,655 A | 5/1996 | Collins et al. | |
| 5,535,389 A | 7/1996 | Elder et al. | |
| 5,542,070 A | 7/1996 | LeBlanc et al. | |
| 5,550,976 A | 8/1996 | Henderson et al. | |
| 5,551,035 A | 8/1996 | Arnold et al. | |
| 5,555,325 A | 9/1996 | Burger | |
| 5,566,330 A | 10/1996 | Sheffield | |
| 5,572,643 A | 11/1996 | Judson | |
| 5,572,648 A | 11/1996 | Bibayan | |
| 5,577,252 A | 11/1996 | Nelson et al. | |
| 5,581,686 A | 12/1996 | Koppolu et al. | |
| 5,581,760 A | 12/1996 | Atkinson et al. | |
| 5,600,789 A | 2/1997 | Parker et al. | |
| 5,602,996 A | 2/1997 | Powers, III et al. | |
| 5,608,720 A | 3/1997 | Biegel et al. | |
| 5,625,783 A | 4/1997 | Ezekiel et al. | |
| 5,627,979 A | 5/1997 | Chang et al. | |
| 5,630,126 A | 5/1997 | Redpath | |
| 5,634,121 A | 5/1997 | Tracz et al. | |
| 5,634,124 A | 5/1997 | Khoyi et al. | |
| 5,640,544 A | 6/1997 | Onodera et al. | |
| 5,644,738 A | 7/1997 | Goldman et al. | |
| 5,659,729 A | 8/1997 | Nielsen | |
| 5,664,133 A | 9/1997 | Malamud et al. | |
| 5,664,178 A | 9/1997 | Sinofsky | |
| 5,668,966 A | 9/1997 | Ono et al. | |
| 5,669,005 A | 9/1997 | Curbow et al. | |
| 5,682,536 A | 10/1997 | Atkinson et al. | |
| 5,689,667 A | 11/1997 | Kurtenbach | |
| 5,689,703 A | 11/1997 | Atkinson et al. | |
| 5,704,029 A | 12/1997 | Wright, Jr. | |
| 5,706,501 A | 1/1998 | Horikiri et al. | |
| 5,717,939 A | 2/1998 | Bricklin et al. | |
| 5,721,824 A | 2/1998 | Taylor | |
| 5,740,439 A | 4/1998 | Atkinson et al. | |
| 5,742,504 A | 4/1998 | Meyer et al. | |
| 5,745,683 A | 4/1998 | Lee et al. | |
| 5,745,712 A | 4/1998 | Turpin et al. | |
| 5,748,807 A | 5/1998 | Lopresti et al. | |
| 5,758,184 A | 5/1998 | Lucovsky et al. | |
| 5,758,358 A | 5/1998 | Ebbo | |
| 5,761,408 A | 6/1998 | Kolawa et al. | |
| 5,761,683 A | 6/1998 | Logan et al. | |
| 5,764,984 A | 6/1998 | Loucks | |
| 5,764,985 A | 6/1998 | Smale | |
| 5,778,372 A | 7/1998 | Cordell et al. | |
| 5,778,402 A | 7/1998 | Gipson | |
| 5,784,555 A | 7/1998 | Stone | |
| 5,790,796 A | 8/1998 | Sadowsky | |
| 5,798,757 A | 8/1998 | Smith | |
| 5,801,701 A | 9/1998 | Koppolu et al. | |
| 5,802,304 A | 9/1998 | Stone | |
| 5,806,079 A | 9/1998 | Rivette et al. | |
| 5,815,830 A | 9/1998 | Anthony | |
| 5,826,265 A | 10/1998 | Van Huben et al. | |
| 5,835,777 A | 11/1998 | Staelin | |
| 5,838,906 A | 11/1998 | Doyle et al. | |
| 5,842,018 A | 11/1998 | Atkinson et al. | |
| 5,845,077 A | 12/1998 | Fawcett | |
| 5,845,090 A | 12/1998 | Collins, III et al. | |
| 5,845,122 A * | 12/1998 | Nielsen et al. | 715/810 |
| 5,854,630 A | 12/1998 | Nielsen | |
| 5,859,973 A | 1/1999 | Carpenter et al. | |
| 5,862,372 A | 1/1999 | Morris et al. | |
| 5,862,379 A | 1/1999 | Rubin et al. | |
| 5,864,819 A | 1/1999 | De Armas et al. | |
| 5,873,088 A * | 2/1999 | Hayashi et al. | 707/100 |
| 5,905,492 A | 5/1999 | Straub et al. | |
| 5,907,621 A | 5/1999 | Bachman et al. | |
| 5,907,704 A | 5/1999 | Gudmundson et al. | |
| 5,910,895 A | 6/1999 | Proskauer et al. | |
| 5,911,776 A | 6/1999 | Guck | |
| 5,915,112 A | 6/1999 | Boutcher | |
| 5,922,072 A | 7/1999 | Hutchinson et al. | |
| 5,928,363 A | 7/1999 | Ruvolo | |
| 5,929,858 A | 7/1999 | Shibata et al. | |
| 5,940,075 A | 8/1999 | Mutschler, III et al. | |
| 5,950,010 A | 9/1999 | Hesse et al. | |
| 5,956,481 A | 9/1999 | Walsh et al. | |
| 5,960,199 A | 9/1999 | Brodsky et al. | |
| 5,963,964 A | 10/1999 | Nielsen | |
| 5,973,696 A | 10/1999 | Agranat et al. | |
| 5,974,454 A | 10/1999 | Apfel et al. | |
| 5,982,370 A | 11/1999 | Kamper | |
| 5,983,348 A | 11/1999 | Ji | |
| 5,987,480 A | 11/1999 | Donohue et al. | |
| 5,991,710 A | 11/1999 | Papineni et al. | |
| 5,991,731 A | 11/1999 | Colon et al. | |
| 5,995,103 A | 11/1999 | Ashe | |
| 5,999,740 A | 12/1999 | Rowley | |
| 6,005,570 A | 12/1999 | Gayraud et al. | |
| 6,012,066 A | 1/2000 | Discount et al. | |
| 6,014,135 A | 1/2000 | Fernandes | |
| 6,016,520 A | 1/2000 | Facq et al. | |
| 6,018,743 A | 1/2000 | Xu | |
| 6,021,403 A | 2/2000 | Horvitz et al. | |
| 6,026,379 A | 2/2000 | Haller et al. | |
| 6,026,416 A | 2/2000 | Kanerva et al. | |
| 6,031,989 A | 2/2000 | Cordell | |
| 6,035,297 A | 3/2000 | Van Huben et al. | |
| 6,035,309 A | 3/2000 | Dauerer et al. | |

| | | | | | | | |
|---|---|---|---|---|---|---|---|
| 6,044,205 | A | 3/2000 | Reed et al. | 6,331,864 | B1 | 12/2001 | Coco et al. |
| 6,052,531 | A | 4/2000 | Waldin et al. | 6,342,907 | B1 | 1/2002 | Petty et al. |
| 6,052,710 | A | 4/2000 | Saliba et al. | 6,343,149 | B1 | 1/2002 | Motoiwa |
| 6,054,987 | A | 4/2000 | Richardson | 6,343,302 | B1 | 1/2002 | Graham |
| 6,058,413 | A | 5/2000 | Flores et al. | 6,343,377 | B1 | 1/2002 | Gessner et al. |
| 6,065,043 | A | 5/2000 | Domenikos et al. | 6,344,862 | B1 | 2/2002 | Williams et al. |
| 6,069,626 | A | 5/2000 | Cline et al. | 6,345,256 | B1 | 2/2002 | Milsted et al. |
| 6,070,184 | A | 5/2000 | Blount et al. | 6,345,278 | B1 | 2/2002 | Hitchcock et al. |
| 6,072,870 | A | 6/2000 | Nguyen et al. | 6,345,361 | B1 | 2/2002 | Jerger et al. |
| 6,078,326 | A | 6/2000 | Kilmer et al. | 6,347,323 | B1 | 2/2002 | Garber et al. |
| 6,078,327 | A | 6/2000 | Liman et al. | 6,349,408 | B1 | 2/2002 | Smith |
| 6,078,924 | A | 6/2000 | Ainsbury et al. | 6,351,574 | B1 | 2/2002 | Yair et al. |
| 6,081,610 | A | 6/2000 | Dwork et al. | 6,353,851 | B1 | 3/2002 | Anupam et al. |
| 6,084,585 | A | 7/2000 | Kraft et al. | 6,353,926 | B1 | 3/2002 | Parthesarathy et al. |
| 6,088,679 | A | 7/2000 | Barkley | 6,356,906 | B1 | 3/2002 | Lippert et al. |
| 6,088,708 | A | 7/2000 | Burch et al. | 6,357,038 | B1 | 3/2002 | Scouten |
| 6,091,417 | A | 7/2000 | Lefkowitz | 6,366,907 | B1 | 4/2002 | Fanning et al. |
| 6,094,657 | A | 7/2000 | Hailpern et al. | 6,366,912 | B1 | 4/2002 | Wallent et al. |
| 6,096,096 | A | 8/2000 | Murphy et al. | 6,367,013 | B1 | 4/2002 | Bisbee et al. |
| 6,097,382 | A | 8/2000 | Rosen et al. | 6,369,840 | B1 | 4/2002 | Barnett et al. |
| 6,098,081 | A | 8/2000 | Heidorn et al. | 6,369,841 | B1 | 4/2002 | Salomon et al. |
| 6,105,012 | A | 8/2000 | Chang et al. | 6,374,402 | B1 | 4/2002 | Schmeidler et al. |
| 6,108,637 | A | 8/2000 | Blumenau | 6,381,742 | B2 | 4/2002 | Forbes et al. |
| 6,108,783 | A | 8/2000 | Krawczyk et al. | 6,381,743 | B1 | 4/2002 | Mutschler, III |
| 6,115,646 | A | 9/2000 | Fiszman et al. | 6,389,434 | B1 | 5/2002 | Rivette et al. |
| 6,121,965 | A | 9/2000 | Kenney et al. | 6,393,456 | B1 | 5/2002 | Ambler et al. |
| 6,122,647 | A | 9/2000 | Horowitz et al. | 6,393,469 | B1 * | 5/2002 | Dozier et al. ............... 709/219 |
| 6,144,969 | A | 11/2000 | Inokuchi et al. | 6,396,488 | B1 | 5/2002 | Simmons et al. |
| 6,151,624 | A | 11/2000 | Teare et al. | 6,397,264 | B1 | 5/2002 | Stasnick et al. |
| 6,154,128 | A | 11/2000 | Wookey et al. | 6,405,221 | B1 | 6/2002 | Levine et al. |
| 6,163,772 | A | 12/2000 | Kramer et al. | 6,405,238 | B1 | 6/2002 | Votipka |
| 6,167,521 | A | 12/2000 | Smith et al. | 6,408,311 | B1 | 6/2002 | Baisley et al. |
| 6,167,523 | A | 12/2000 | Strong | 6,414,700 | B1 | 7/2002 | Kurtenbach et al. |
| 6,182,094 | B1 | 1/2001 | Humpleman et al. | 6,421,070 | B1 | 7/2002 | Ramos et al. |
| 6,182,095 | B1 | 1/2001 | Leymaster et al. | 6,421,656 | B1 | 7/2002 | Cheng et al. |
| 6,188,401 | B1 | 2/2001 | Peyer | 6,421,777 | B1 | 7/2002 | Pierre-Louis |
| 6,191,797 | B1 | 2/2001 | Politis | 6,425,125 | B1 | 7/2002 | Fries et al. |
| 6,192,367 | B1 | 2/2001 | Hawley et al. | 6,429,885 | B1 | 8/2002 | Saib et al. |
| 6,195,661 | B1 | 2/2001 | Filepp et al. | 6,434,563 | B1 | 8/2002 | Pasquali et al. |
| 6,199,204 | B1 | 3/2001 | Donohue | 6,434,564 | B2 | 8/2002 | Ebert |
| 6,209,128 | B1 | 3/2001 | Gerard et al. | 6,442,563 | B1 | 8/2002 | Bacon et al. |
| 6,216,152 | B1 | 4/2001 | Wong et al. | 6,442,755 | B1 | 8/2002 | Lemmons et al. |
| 6,219,423 | B1 | 4/2001 | Davis | 6,446,110 | B1 | 9/2002 | Lection et al. |
| 6,219,698 | B1 | 4/2001 | Iannucci et al. | 6,449,617 | B1 | 9/2002 | Quinn et al. |
| 6,225,996 | B1 | 5/2001 | Gibb et al. | 6,457,009 | B1 | 9/2002 | Bollay |
| 6,235,027 | B1 | 5/2001 | Herzon | 6,460,058 | B2 | 10/2002 | Koppolu et al. |
| 6,243,088 | B1 | 6/2001 | McCormack et al. | 6,463,419 | B1 | 10/2002 | Kluss |
| 6,253,366 | B1 | 6/2001 | Mutschler, III | 6,470,349 | B1 | 10/2002 | Heninger et al. |
| 6,253,374 | B1 | 6/2001 | Dresevic et al. | 6,473,800 | B1 | 10/2002 | Jerger et al. |
| 6,263,313 | B1 | 7/2001 | Milsted et al. | 6,476,828 | B1 | 11/2002 | Burkett et al. |
| 6,266,810 | B1 | 7/2001 | Tanaka et al. | 6,476,833 | B1 | 11/2002 | Moshfeghi |
| 6,268,852 | B1 | 7/2001 | Lindhorst et al. | 6,477,544 | B1 | 11/2002 | Bolosky et al. |
| 6,272,506 | B1 | 8/2001 | Bell | 6,480,860 | B1 | 11/2002 | Monday |
| 6,275,227 | B1 | 8/2001 | DeStefano | 6,487,566 | B1 | 11/2002 | Sundaresan |
| 6,275,599 | B1 | 8/2001 | Adler et al. | 6,490,601 | B1 | 12/2002 | Markus et al. |
| 6,279,042 | B1 | 8/2001 | Ouchi | 6,493,702 | B1 | 12/2002 | Adar et al. |
| 6,281,896 | B1 | 8/2001 | Alimpich et al. | 6,501,864 | B1 | 12/2002 | Eguchi et al. |
| 6,282,709 | B1 | 8/2001 | Reha et al. | 6,502,101 | B1 | 12/2002 | Verprauskus et al. |
| 6,282,711 | B1 | 8/2001 | Halpern et al. | 6,502,103 | B1 | 12/2002 | Frey et al. |
| 6,286,033 | B1 | 9/2001 | Kishinsky et al. | 6,505,200 | B1 | 1/2003 | Ims et al. |
| 6,292,897 | B1 | 9/2001 | Gennaro et al. | 6,505,230 | B1 | 1/2003 | Mohan et al. |
| 6,292,941 | B1 | 9/2001 | Jollands | 6,505,300 | B2 | 1/2003 | Chan et al. |
| 6,297,819 | B1 | 10/2001 | Furst | 6,507,856 | B1 | 1/2003 | Chen et al. |
| 6,300,948 | B1 * | 10/2001 | Geller et al. ............... 715/866 | 6,516,322 | B1 | 2/2003 | Meredith |
| 6,307,955 | B1 | 10/2001 | Zank et al. | 6,519,617 | B1 | 2/2003 | Wanderski et al. |
| 6,308,179 | B1 | 10/2001 | Petersen et al. | 6,535,229 | B1 * | 3/2003 | Kraft ....................... 715/764 |
| 6,308,273 | B1 | 10/2001 | Goertzel et al. | RE38,070 | E | 4/2003 | Spies et al. |
| 6,311,221 | B1 | 10/2001 | Raz et al. | 6,546,546 | B1 | 4/2003 | Van Doorn et al. |
| 6,311,271 | B1 | 10/2001 | Gennaro et al. | 6,546,554 | B1 | 4/2003 | Schmidt et al. |
| 6,314,415 | B1 | 11/2001 | Mukherjee | 6,549,221 | B1 | 4/2003 | Brown et al. |
| 6,321,259 | B1 | 11/2001 | Ouellette et al. | 6,549,878 | B1 | 4/2003 | Lowry et al. |
| 6,321,334 | B1 | 11/2001 | Jerger et al. | 6,549,922 | B1 | 4/2003 | Srivastava et al. |
| 6,327,628 | B1 | 12/2001 | Anuff et al. | 6,553,402 | B1 | 4/2003 | Makarios et al. |

| | | |
|---|---|---|
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 * | 9/2005 | Lin et al. ............ 715/762 |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalmanchi |
| 7,107,521 B2 | 9/2006 | Santos |
| 7,120,863 B1 | 10/2006 | Wang |
| 7,124,167 B1 | 10/2006 | Bellotti et al. |
| 7,130,885 B2 * | 10/2006 | Chandra et al. ............ 709/206 |
| 7,143,341 B1 | 11/2006 | Kohli |
| 7,146,564 B2 | 12/2006 | Kim et al. |
| 7,152,205 B2 | 12/2006 | Day et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,665 B2 | 4/2007 | Eshghi et al. |
| 7,200,816 B2 | 4/2007 | Falk et al. |
| 7,213,200 B2 | 5/2007 | Abe et al. |
| 7,236,982 B2 | 6/2007 | Zlatanov et al. |

| Patent/Publication | Date | Name |
|---|---|---|
| 7,249,328 B1 | 7/2007 | Davis |
| 7,272,789 B2 * | 9/2007 | O'Brien .................... 715/247 |
| 7,281,018 B1 | 10/2007 | Begun et al. |
| 7,284,208 B2 | 10/2007 | Matthews |
| 7,287,218 B1 | 10/2007 | Knotz et al. |
| 7,296,017 B2 | 11/2007 | Larcheveque et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,178 B1 | 2/2008 | Pierre et al. |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,373,595 B2 | 5/2008 | Jones et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,441,200 B2 | 10/2008 | Savage |
| 7,496,632 B2 * | 2/2009 | Chapman et al. ............ 709/206 |
| 7,496,837 B1 | 2/2009 | Larcheveque et al. |
| 7,543,228 B2 | 6/2009 | Kelkar |
| 7,549,115 B2 | 6/2009 | Kotler |
| 7,584,417 B2 | 9/2009 | Friend |
| 7,613,996 B2 | 11/2009 | Dallett et al. |
| 2001/0007109 A1 | 7/2001 | Lange |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0044850 A1 | 11/2001 | Raz et al. |
| 2001/0051928 A1 | 12/2001 | Brody |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0052769 A1 | 5/2002 | Navani et al. |
| 2002/0053021 A1 | 5/2002 | Rice et al. |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0099952 A1 | 7/2002 | Lambert et al. |
| 2002/0100027 A1 | 7/2002 | Binding et al. |
| 2002/0107885 A1 | 8/2002 | Brooks et al. |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184219 A1 | 12/2002 | Preisig et al. |
| 2002/0184485 A1 | 12/2002 | Dray et al. |
| 2002/0188597 A1 | 12/2002 | Kern et al. |
| 2002/0188613 A1 | 12/2002 | Chakraborty et al. |
| 2002/0194219 A1 * | 12/2002 | Bradley et al. .............. 707/506 |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0037303 A1 | 2/2003 | Bodlaender et al. |
| 2003/0038846 A1 | 2/2003 | Hori et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0061386 A1 | 3/2003 | Brown |
| 2003/0061567 A1 | 3/2003 | Brown et al. |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0140160 A1 | 7/2003 | Raz et al. |
| 2003/0142072 A1 | 7/2003 | Lapstun et al. |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |
| 2003/0212902 A1 | 11/2003 | van der Made |

| | | |
|---|---|---|
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0015783 A1 | 1/2004 | Lennon et al. |
| 2004/0024842 A1 | 2/2004 | Witt |
| 2004/0030991 A1 | 2/2004 | Hepworth et al. |
| 2004/0039881 A1* | 2/2004 | Shoebridge et al. ......... 711/147 |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0046789 A1 | 3/2004 | Inanoria |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0172442 A1 | 9/2004 | Ripley |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0216084 A1 | 10/2004 | Brown et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0260593 A1 | 12/2004 | Abraham-Fuchs et al. |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033728 A1 | 2/2005 | James |
| 2005/0038711 A1 | 2/2005 | Marlelo |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1* | 3/2005 | Tattrie et al. ................. 715/769 |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1 | 7/2005 | Joshi et al. |
| 2005/0160398 A1 | 7/2005 | Bjornson et al. |
| 2005/0171746 A1 | 8/2005 | Thalhammer-Reyero |
| 2005/0198086 A1 | 9/2005 | Moore |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0246304 A1 | 11/2005 | Knight et al. |
| 2005/0262112 A1 | 11/2005 | Moore |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0129583 A1 | 6/2006 | Catorcini et al. |
| 2006/0129978 A1 | 6/2006 | Abriani et al. |
| 2006/0143220 A1 | 6/2006 | Spencer |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0200754 A1 | 9/2006 | Kablesh et al. |
| 2007/0005611 A1 | 1/2007 | Takasugi et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |

| | | | |
|---|---|---|---|
| 2007/0074106 | A1 | 3/2007 | Ardeleanu |
| 2007/0088554 | A1 | 4/2007 | Harb et al. |
| 2007/0094589 | A1 | 4/2007 | Paoli |
| 2007/0100877 | A1 | 5/2007 | Paoli |
| 2007/0101280 | A1 | 5/2007 | Paoli |
| 2007/0118803 | A1 | 5/2007 | Walker et al. |
| 2007/0130500 | A1 | 6/2007 | Rivers-Moore et al. |
| 2007/0130504 | A1 | 6/2007 | Betancourt et al. |
| 2007/0186157 | A1 | 8/2007 | Walker et al. |
| 2007/0208606 | A1 | 9/2007 | MacKay et al. |
| 2007/0208769 | A1 | 9/2007 | Boehm et al. |
| 2007/0276768 | A1 | 11/2007 | Pallante |
| 2008/0028340 | A1 | 1/2008 | Davis |
| 2008/0126402 | A1 | 5/2008 | Sikchi et al. |
| 2009/0177961 | A1 | 7/2009 | Fortini et al. |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 83085960 | 4/1988 |
| JP | 401173140 | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10-2207805 | 8/1998 |
| JP | 10207805 | 8/1998 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 9/2006 |

OTHER PUBLICATIONS

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2096, at <<http://www.pewebopedia.com/TERM/O/OLE.html>>, Jupitermedia Corporation, 2006, pp. 7.

Altova, Inc., "XML Spy 4.0 Manual," Altova Inc. & Altova GmbH, coyright 1998-2001, Chapters 1, 2, and 6, encompassing pp. 1-17, 18-90, and 343-362.

Cybook, Inc.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, p. 1 (available at http://jwalk.com/ss//excel/tips/tip62.htm).

Macromedia, Inc.: "Dreamweaver Technote, Changes in copying and pasting in Dreamweaver 4" Internet Article (online). *the whole document*.

Atova, "User Reference manual Version 4.4, XML Spy suite 4.4," Atova Ges.m.b.H and Altova, Inc., May 24, 2002, pages cover, copyright page, 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite in an integrated, Web publishing environment," (Partners's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

IBM: Stack Algorithm for Extractin Subtree from Serialized Tree, Mar. 1, 1994, TDB-ACC-NONN94033, 3 pages.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

LeBlond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

"Architecture for a Dynamic Information Area Control" IBM Technical Disclosure Bulletin IBM Corp. New York US vol. 37 No. 10 Jan. 10, 1994. pp. 245-246.

Alschuler Liora "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 15, 2003.

Au Irene et al. "Netscape Communicator's Collapsible Toolbars" CHI'98 Human Factors in Computing Systems Conference Proceedings Los Angeles CA Apr. 18-23, 1998 pp. 81-86.

Battle Steven A. et al.; "Flexible Information Presentation with XML" 1998 The Institution of Electrical Engineers 6 pages.

Brogden William; "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

Chen Yi et al.: A; "XKvalidator: A Constraint Validator for XML" CIKM '-2 Nov. 4-9, 2002 Copyright 2002 ACM 1-58113-492-4/02/0011 pp. 446-452.

Ciancarini Paolo et al.; "Managing Complex Documents Over the WWW: A Case Study for XML" IEEE Transactions on Knowledge and Data Engineering Vo.I. 11 No. 4 Jul./Aug. 1999. pp. 629-938.

Davidow Ari: Alle; "XML Editors: Allegations of Functionality in search of reality" Internet 'Online! 1999 XP002230082 retrieved from the Internet <URL:http://www.ivritype.com/xml/>.

Kanemoto Hirotaka et al; "An Efficiently Updatable Index Scheme for Structured Documents" 1998 IEEE pp. 991-996.

Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

Usdin Tommie et al.; Not a; "XML: Not a Silver Bullet But a Great Pipe Wrench" Standardview vol. 6. No. 3 Sep. 1998 pp. 125-132.

Chien Shu-Yao et al.; "Efficient Management of Multiversion Documents by Object Referencing" Proceedings of the 27th VLDB Conference 2001 pp. 291-300.

Chien Shu-Yao et al.; "Efficient schemes for managing mulitversion XML documents" VLDB Journal (2002) pp. 332-352.

Chien Shu-Yao et al.; "Storing and Querying Multiversion XML Documents using Durable Node Numbers" IEEE 2002 pp. 232-241.

Chien Shu-Yao et al.; "XML Document Versioning" SIGMOD Record vol. 30 No. 3 Sep. 2001 pp. 46-53.

Dyck Timothy; "XML Spy Tops as XML Editor" http://www.eweek.com/article2/0395972404100.asp Nov. 25, 2002 4 pages.

Haukeland Jan-Henrick; "Tsbiff—tildeslash biff—version 1.2.1" Internet Document [Online] Jun. 1999 URL: http://web.archive.org/web/19990912001527/http://www.tildeslash.com/tsbiff/.

Nelson Mark; "Validation with MSXML and XML Schema" Windows Developer Magazine Jan. 2002 pp. 35-38.

Netscape Communication Corpora; "Netscape Communicator 4.61 for OS/2 Warp" Software 1999 The whole software release & "Netscape—Version 4.6 [en]-010615" Netscape Screenhot Oct. 2, 2002.

Noore A.; "A secure conditional access system using digital signature and encryption" 2003 Digest of Technical Papers. International Conference on Consumer Electronics Jun. 2003 pp. 220-221.

Rogge et al.; "Validating MPEG-21 Encapsulated Functional Metadata" IEEE 2002 pp. 209-212.

Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.

Cheng Ya Bing et al.; "Designing Valid XML Views" ER 2002 LNCS 2503 2002 Springer-Verlag Berlin Heidelberg 2002 pp. 463-477.

Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.

Dayton Linnea and Jack Davis; "Photo Shop 5/5.5 WOW! Book" 2000 Peachpit Press pp. 8-17.

Hall Richard Scott; "Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

Hardy Mathew R. B. et al; "Mapping and Displaying Structural Transformations between XML and PDF" DocEng '02 Nov. 8-9, 2002 Copyright 2002 ACM 1-58113-597-7/02/0011 pp. 95-102.

Kim Sang-Kyun et al.; "Immediate and Partial Validation Mechanism for the Conflict Resolution of Update Operations in XML Databases" WAIM 2002 LNCS 2419 2002 pp. 387-396 Springer-Verlag Berlin Heidelberg 2002.

Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Tomimori et al.; "An Efficient and Flexible Access Control Framework for Java Programs in Mobile Terminals"; 22nd International Conference on Distributed Computing Systems Workshops; 2002; pp. 777-782.

Van Hoff Arthur et al.; "The Open Software Description Format" Online Aug. 13, 1997 retrieved from the Internet on Nov. 7, 2003: <http://www.w3.org/TR/NOTE-OSD> 11 pages.

Verlamis Iraklis et al.; "Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

Williams Sara and Charlie Kin; "The Component Object Model" A Technical Overview Oct. 1994 Microsoft Corp. pp. 1-14.

Pacheco et al., "Delphi 5 Developer's Guide," Sams Publishing, 1999, Chapter 31 Section: Data Streaming, 6 pages.

"Netscape window," Netscape Screenshot Oct. 2, 2002.

Clarke P., "From small beginnings" Knowledge Management Nov. 2001, pp. 28-30.

Hwang et al., "Micro-Firewalls for Dynamic Network Security with Distributed Intrusion Detection"; IEEE International Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

Sun Q. et al., "A robust and secure media signature scheme for JPEG images" Proceedings of 2002 IEEE Workshop on Multimedia Signal Processing, Dec. 2002, pp. 296-299.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Trupin J., "The Visual Programmer," Microsoft Systems Journal, Apr. 1996, pp. 103-105.

Zdonik S., "Object Management System Concepts," ACM, 1984, pp. 13-19.

"Store and Organize Related Project Files in a Binder," Getting Results with Microsoft Office, 1990, pp. 109-112.

Barker et al., "Creating In-Line Objects Within an Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM-Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Clark James—W3C Editor; "XSL Transformation (XSLT) Verison 1.0" Nov. 16, 1999 W3C (MIT INRIA Kejo) pp. 1-156.

Description of Whitehill Composer software product producted by Whitehill Technologies Inc. available at <http://www.xml.com/pub/p/221> accessed on Apr. 8, 2004, two pages.

McCright J.S.; "New Tool Kit to Link Groove with Microsoft Sharepoint" eWeek Enterprise News & Reviews Ziff Davis Media INc. Jul. 29, 2002 1 page.

Musgrave S; "Networking technology—impact and opportunities" Survey and Statistical Computing 1996. Proceedings of the Second ASC International Conference. Sep. 1996. pp. 369-378. London UK.

Rapaport L; "Get more from SharePoint" Transform Magazine vol. 11 No. 3. Mar. 2002 pp. 1315.

W3C Editor James Clark and Ste; "XML Path Language (XPath) Version 1.0" Nov. 16, 1999W3C (MIT INRIA Kejo) pp. 1-49.

OMG XML Metadata Interchange (XMI) Specification Version 1.2 Jan. 2002.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997),pp. 42-43, 54-58.

"Microsoft Word 2000", Screenshots,(1999),1-5.

Beauchemin, Dave, "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo , "Running Microsoft Word 97", 314-315, 338, 361-362, 390, and 714-719.

Brabrand, et al., "Power Forms Declarative Client-side Form Field Validation", (2002), 1-20.

Dubinko, Micah , "XForms and Microsoft InfoPath", Retrieved from the Internet at http://www.xml.com/lpt/a/1311 on Jan. 21, 2007,(Oct. 29, 2003).

Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro, et al., "A Dynamic User Interface for Document Assembly", Department of Computer Science, University of Helsinki,(Nov. 2002).

Nelson, Joe, "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan, "Microsoft InfoPath 2003 By Example", Retrieved from the Internet at http://www.perfectxml.com/InfoPath.asp on Jan. 21, 2007,(Apr. 20, 2003).

Udell, Jon, "InfoPath and XForms", Retrieved from the Internet at http://weblog.infoworld.com/udell/2003/02/26.html,(Feb. 26, 2003).

Microsoft Corporation, "Microsoft Computer Dictionary" Microsoft Press, Fifth Edition, p. 149.

Altova, et al., "User and Reference Manual Version 4.4", www.xmlspy.com, (May 24, 2007),1-565.

"XForm 1.0", W3C,(Jul. 16, 2001).

Grosso, et al., "XML Fragment Interchange", W3C,(Feb. 2001),1-28.

"Microsoft Word 2000 Screenshots", (2000),11-17.

XMLSPY "XmlSpy 2004 Enterprise Edition Manual", Altova,(May 17, 2004),1-25, 220-225.

STYLUSSTUDIO, "StylusStudio: XPath Tools", 2004-2007, StylusStudio,1-14.

DODDS, "Toward an XPath API", xml.com,(May 7, 2001),1-3.

ALTOVA, "Altova Tools for XPath 1.0/2.0", Altova,1-12.

"Microsoft Word 2000 Screenshots", Word,(2000),1-17.

Pacheco, Xavier et al., "Delphi 5 Developer's Guide", Sams Publishing. Chapter 31, Section: Data Streaming,(1999),4.

Hu, et al., "A Programmable Editor for Developing Structured Documents based on Bidirectional Transformations", ACM,(Aug. 2004),178-179.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

Bradley, Neil "The XML Companion, Third Edition", *Published by Addison Wesley Professional*, http://proquest.safaribooksonline.com0201770598, http,(Dec. 12, 2001),1-18.

Klarlund, Nils "DSD: A Schema Language for XML", *ACM, FSMP* Portland Oregon, (2000),101-111.

Watt, Andrew "MIcrosoft Office Infopath 2003 Kick Start", (*Published by Sams*) Print ISBN-10:0-672-32623-X, (Mar. 24, 2004),1-57.

Kay, Michael "XSL Transfornmations (XSLT) Version 2.0", http://wwwv.w3.orq/TR/2005/WD-xsIt20-20050404, (04/205),1-374.

Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.

"Notice of Allowance", U.S. Appl. No. 10/988,718, (Apr. 9, 2009),17 pages.

"Final Office Action", U.S. Appl. No. 11/107,347, (Apr. 2, 2009),15 pages.

"Restriction Requirement", U.S. Appl. No. 11/227,550, (Apr. 2, 2009),8 pages.

"Non Final Office Action", U.S. Appl. No. 10/955,665, (Apr. 2, 2009),19 pages.

"Final Office Action", U.S. Appl. No. 11/203,818, (Apr. 14, 2009),31 pages.

"Final Office Action", U.S. Appl. No. 11/044,106, (Apr. 13, 2009),20 pages.

"Final Office Action", U.S. Appl. No. 11/226,044, (Apr. 20, 2009),24 pages.

"Final Office Action", U.S. Appl. No. 11/056,500, (Apr. 16, 2009),10 pages.

"Final Office Action", U.S. Appl. No. 11/203,937, (May 7, 2009),13 pages.

"Non Final Office Action", U.S. Appl. No. 10/955,666, (May 7, 2009),28 pages.

"Non Final Office Action", U.S. Appl. No. 10/876,433, (Apr. 24, 2009),62 pages.

"Non Final Office Action", U.S. Appl. No. 10/916,692, (Apr. 30, 2009),14 pages.

"Non Final Office Action", U.S. Appl. No. 09/599,809, (May 13, 2009),25 pages.

"Non FInal Office Action", U.S. Appl. No. 11/295,178, (May 27, 2009),111 pages.

"Non Final Office Action", U.S. Appl. No. 10/990,152, (May 28, 2009),19 pages.

"Final Office Action", U.S. Appl. No. 11/036,910, (Jun. 1, 2009),15 pages.

"Non Final Office Action", U.S. Appl. No. 10/857,689, (Jun. 11, 2009),25 pages.

"Non FInal Office Action", U.S. Appl. No. 11/095,254, (Jun. 8, 2009),21 pages.

"Final Office Action", U.S. Appl. No. 11/234,767, (Jun. 10, 2009),24 pages.

"Foreign Office Action", Application Serial No. 2002-503702, Final Notice of Rejection,(Jun. 5, 2009),212 pages.

Kaori, Iwantani et al., "Perfect Manual of Clarisworks 4.0 for Macintosh", 1st Edition, Japan,(07/297),pp. 153-167.

Noriko, Matsushita "Step-up Training of Clarisworks (tabulation), Successful Use of Spreadsheet and Tabulation", Mac People, vol. 4, No. 19,(Oct. 1, 1998),pp. 138-139.

Akihiro, Senda "Word 2000, Conservative- Looking but 'Attentive' New Function", NIKKEI PC 21, vol. 4, No. 8,(Aug. 1, 1999),pp. 115-116.

Yasuji, Fukuhara "Clarisworks, Introduction to Business Document Construction, No. 4, Estimate", NIKKEI MAC, No. 14,(May 17, 1994),pp. 197-204.

Acklen, et al., "Using Corel Wordperfect 9", Que Corporation,,(1998),pp. 251-284, 424-434, 583-585.

"Final Office Action", U.S. Appl. No. 10/976,451 (Jul. 2, 2009), 22 pages.

Reagan, Moore W., et al., "Collection-based persistent digital archives", U.S. Appl. No. 60/191,662, filed Mar. 23, 2000, 133.

"Notice of Allowance", U.S. Appl. No. 10/404,312, (Jan. 12, 2009),12 pages.

"Final Office Action", U.S. Appl. No. 10/857,689 (Jan. 6, 2009),23 pages.

"Non Final Office Action", U.S. Appl. No. 10/977,198, (Feb. 2, 2009),15 pages.

"Non Final Office Action", U.S. Appl. No. 10/939,588 (Feb. 18, 2009),40 pages.

"Non Final Office Action", U.S. Appl. No. 10/976,451, (Feb. 23, 2009),39 pages.

"Non final Office Action", U.S. Appl. No. 11/234,767 (Feb. 26, 2009),37 pages.

"Notice of Allowance", U.S. Appl. No. 11/167,514, (Mar. 11, 2009),6 pages.

"Non Final Office Action", U.S. Appl. No. 10/942,528, (Mar. 6, 2009),31 pages.

"Non Final Offfice Action", U.S. Appl. No. 11/170,521, (Jan. 21, 2009),86 pages.

"Foreign Office Action", Application Serial No. 2,412,611, (Feb. 9, 2009),6 pages.

"Foreign Office Action", Application Serial No. 200610003709.2, (Jan. 9, 2009),8 pages.

"Foreign Office Action", Application Serial No. 200610051554.X, (Jul. 10, 2009), 11 pages.

"Non-Final Office Action", U.S. Appl. No. 11/227,550, (Aug. 3, 2009),10 pages.

"Notice of Allowance", U.S. Appl. No. 11/203,937, (Aug. 03, 2009), 7 pages.

"Non-Final Office Action", U.S. Appl. No. 11/234,767, (Aug. 12, 2009), 24 Pages.

"Final Office Action", U.S. Appl. No. 10/977,198, (Aug. 19, 2009),15 pages.

"Non-Final Office Action", U.S. Appl. No. 10/939,588, (Aug. 27, 2009), 28 pages.

"Final Office Action", U.S. Appl. No. 11/170,521, (Sep. 08, 2009), 12 pages.
"Final Office Action", U.S. Appl. No. 10/402,640, (Aug. 28, 2009), 17 pages.
"Notice of Allowance", U.S. Appl. No. 11/203,937, Supplemental, (Sep. 15, 2009) 2 pages.
"Final Office Action", U.S. Appl. No. 10/942,528, (Sep. 17, 2009), 27 pages.
"Non-Final Office Action", U.S. Appl. No. 11/107,347, (Sep. 17, 2009), 9 pages.
"Non-Final Office Action", U.S. Appl. No. 11/044,106, (Sep. 24, 2009), 17 pages.
"Notice of Allowance", U.S. Appl. No. 11/203,937, (Aug. 31, 2009), 2 pages.
"Non-Final Office Action", U.S. Appl. No. 11/567,149, (Sep. 8, 2009), 5 pages.
"HP Blade Server BH Series Operating System Guide", Hewlett-Packard, (Jul. 2002), 69.
"Final Office Action", U.S. Appl. No. 10/955,666, (Oct. 14, 2009), 24 pages.
Rado, Dave: "How to create a template that makes it easy for users to "fill in the blanks", withour doing any programming" Microsoft Word MVP FAQ Site, (online) Apr. 30, 2004, the whole document.

* cited by examiner

302

Domestic Address:

| Street: | |
|---|---|
| City: | |
| State: | |
| ZIP Code: | |

| International Address: | |
|---|---|
| Street: | |
| City | |
| Province: | |
| Country: | |

Domestic Address:

Street:
City:
State:
ZIP Code:

☐ Choice Section (default)

International Address:

Street:
City:
Province:
Country:

☐ Choice Section
Choice Group

MUTUALLY EXCLUSIVE OPTIONS IN ELECTRONIC FORMS

TECHNICAL FIELD

This invention relates to mutually exclusive options in electronic forms.

BACKGROUND

Extensible markup language (XML) is increasingly becoming the preferred format for transferring data. XML is a tag-based hierarchical language that is extremely rich in terms of the data that it can be used to represent. For example, XML can be used to represent data spanning the spectrum from semi-structured data (such as one would find in a word-processing document) to generally structured data (such as that which is contained in a table). XML is well-suited for many types of communication including business-to-business and client-to-server communication.

Data represented in XML is often created and retained in electronic documents, such as electronic forms. An electronic form that is written in XML typically is governed by an XML schema (XSD) and can be altered by applying an eXtensible Style-sheet Language Transformation (XSLT) file on the form. For more information on XML, XSLT, and XSD (schemas), the reader is referred to the following documents which are the work of, and available from the W3C (World Wide Web consortium): XML Schema Part 2: Datatypes; XML Schema Part 1: Structures; and XSL Transformations (XSLT) Version 1.0; and XML 1.0 Second Edition Specification.

In some instances, a schema governing an electronic form may define sets of information that are syntactically mutually exclusive, such as a schema defining an address as either an international address or a U.S. address, but not both at the same time. The schema may define these sets to enforce a mutual exclusivity.

Mutual exclusivity may be a useful way in which to govern sets of information that may potentially be entered into an electronic form, such as when a user enters either a U.S. mailing address or an international mailing address for a particular person, by permitting only one set of information when only one set is useful or possible (e.g., when a person can have only one address).

Some electronic forms enable users to enter information into both mutually exclusive options at the same time but in so doing these forms are not respecting throughout the editing process the syntax defined in the schema. In the ongoing example, these electronic forms may present two groups of data-entry fields, one designed for entry of a U.S. address and the other designed for entry of an international address. The schemas governing these electronic forms, however, do not permit both of these options to exist at once. Thus, the electronic forms may present both groups of data-entry fields but in doing so permit, at least temporarily, the electronic form to be invalid to the form's schema. If the form remains invalid, it can be useless.

To rectify this invalid state, a programmer may write script designed to fix the invalid state. If successful, this script may select a part of the form's data that should be retained and a part that should be removed. But this script can require extensive time and programming experience to write. And in some cases, the invalid state is not properly corrected by the script, causing the form to either remain invalid, require a person to manually correct the invalidity, or permit erroneous data to be retained.

SUMMARY

Systems and/or methods ("tools") enabling creation and/or use of an electronic form capable of allowing a user to select from mutually exclusive options without the electronic form being in an invalid state are described.

BRIEF DESCRIPTION OF THE DRAWINGS

FIG. 3 illustrates an exemplary domestic-address set of data-entry fields.

FIG. 5 illustrates an exemplary international-address set of data-entry fields.

FIG. 8 illustrates the form-design area of FIG. 7 updated to show a graphical selection of two options placed within an option area of the non-repeating container.

The same numbers are used throughout the disclosure and figures to reference like components and features.

DETAILED DESCRIPTION

Overview

Tools described below enable creation and/or use of an electronic form capable of allowing a user to select from mutually exclusive options without the electronic form being in an invalid state.

The tools may enable creation of these mutually exclusive options in an electronic form graphically, such as through enabling a form designer to graphically select components representing these options. By doing so, the tools enable form designers to quickly and easily create mutually exclusive options for electronic forms without needing to write script or have extensive programming experience.

Architecture

Figure 1:
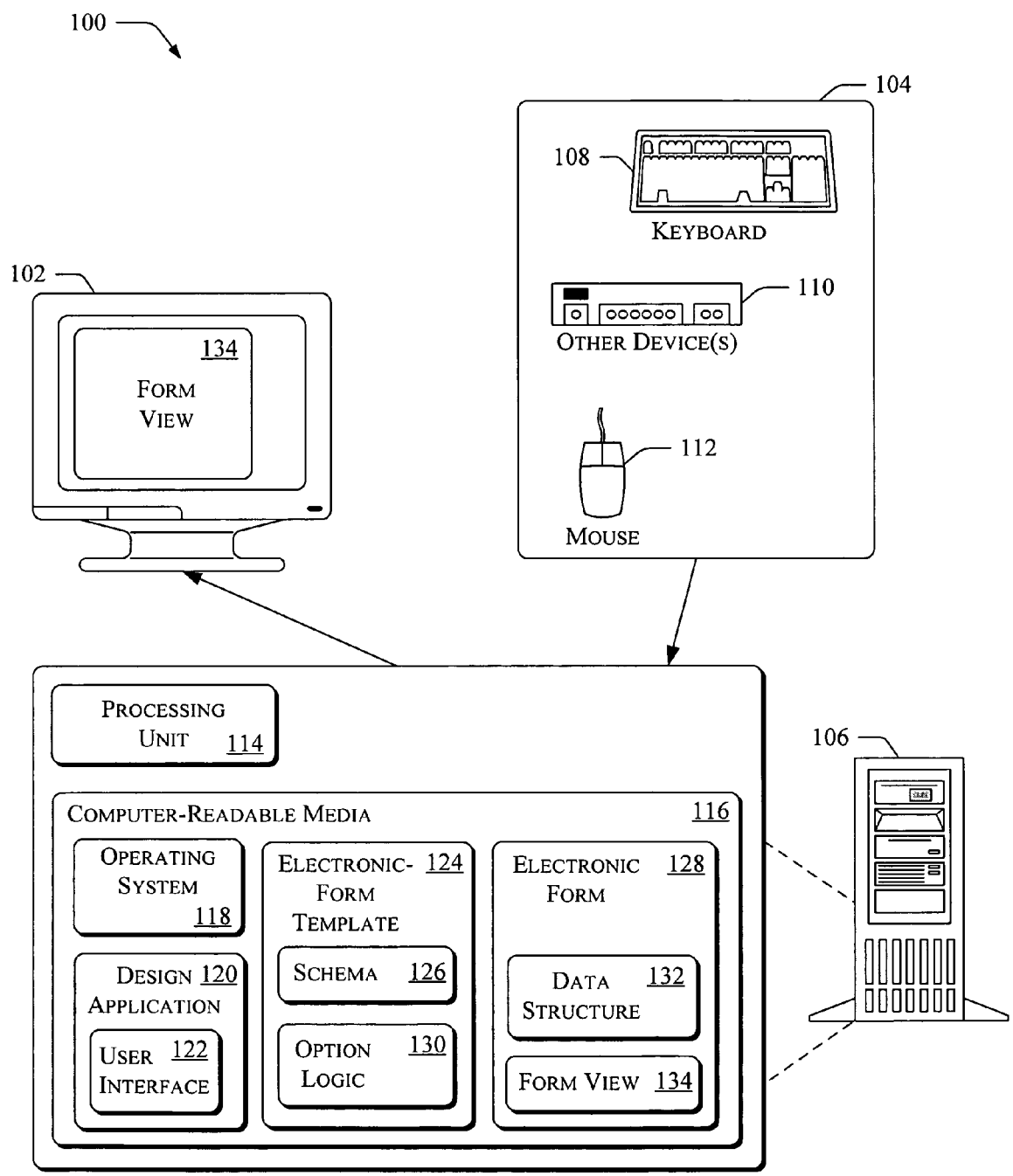
FIG. 1 illustrates an exemplary architecture capable of facilitating creation and use of electronic forms.

Referring to FIG. 1, an exemplary architecture 100 capable of facilitating creation and use of electronic forms is shown. The architecture 100 comprises a display 102, one or more user-input devices 104, and a computer 106. The user-input devices 104 comprise any device allowing a computer to receive a designer's preferences, such as a keyboard 108, other device(s) 110 (e.g., a touch screen, a voice-activated input device, a track ball, etc.), and a mouse 112. The computer comprises a processing unit 114 capable of executing computer-readable media 116.

The computer-readable media comprises an operating system 118 and one or more applications stored in memory and executable by the processing unit. One particular application is a design application 120, which may allow a form designer to create mutually exclusive options for an electronic form with little or no programming skill. The design application is capable of providing a visual what-you-see-is-what-you-get (WYSIWYG) user interface 122 that, in one embodiment, enables designers to graphically construct mutually exclusive options by visually selecting graphics and arranging them in a manner that can be intuitive and straight forward.

An electronic-form template 124 is also shown. This template comprises a schema 126 governing electronic form 128, and option logic 130. The option logic may be part of or separate from the template. The electronic form comprises a data structure 132 and a form view 134. The data structure may be arranged hierarchically and comprise nodes. The data structure may also be transformed to render the form view, which enables data entry into the electronic form. In one embodiment, the data structure comprises eXtensible Markup Language (XML) and can be transformed with an extensible Style-sheet Language Transformation (XSLT) to produce HyperText Machine Language (HTML) that is viewable and through which a user can enter information.

Mutually Exclusive Options

Before setting out exemplary processes for building mutually exclusive options into electronic forms, the following discussion describes examples of these options and how they may be used.

Generally, mutually exclusive options in the context of electronic forms comprise a set of options each of which excludes the other. These mutually exclusive options have many applications in electronic forms. Mailing addresses that are either domestic or international, travel that is either by air or car, or a payment method that is either through paper billing or electronic wire transfer, for instance, each may be a set of mutually exclusive options.

Often, this mutual exclusivity is tied to differences in how the data for the options is entered or stored. An international address, for instance, often does not have a ZIP code, while a domestic (U.S.) address does. Air travel may need a data-entry field and corresponding data structure in the electronic form for a frequent flier program number, while car travel does not. Paper billing may need a physical address, while an electronic wire transfer instead may need a bank deposit number and password. Thus, mutually exclusive options in electronic forms are useful to users but often need to be entered and stored in different ways.

To enable information to be entered and stored in different ways, each mutually exclusive option may correspond to and be represented in an electronic form's data structure by a data substructure (e.g., one or more nodes of a tree data structure). Because the options represented by these substructures are mutually exclusive, a schema defining the syntax of the data for the electronic form will deem the electronic form invalid if more than one of these substructures is present in the form's data structure at one time. If the substructures for the mutually exclusive options are designed to be present in a same portion of the electronic form's data structure, the schema can require that only one of data substructures occupy that portion at once for the electronic form to remain valid. Thus, in that portion of the data structure a data substructure corresponding to only one mutually exclusive option is permitted. If, for example, the portion is designed to store a mailing address, which may either be domestic or international, the data substructure for the domestic address or the international address may be present but not both.

To show and enable entry into a data substructure, the electronic form may be represented with a form view that is a transformation of the data structure. If this is the case, to present data-entry fields for each of the mutually exclusive options at once (described in the Background section above), the data structure may need to contain all of the options at once. But in so doing, the electronic form will be invalid to its governing schema because it contains two or more mutually exclusive options at once.

Electronic forms described and built herein, however, are capable of enabling a user to enter information into one of multiple, mutually exclusive options without the electronic form being invalid.

Exemplary User Interaction With Mutually Exclusive Options

These electronic forms, in conjunction with other application(s) described herein or otherwise, are capable of enabling a user to select one of the mutually exclusive options in which to enter information. The user can do so passively, by accepting a default option, or actively by swapping a default option with another option or selecting an option from a list of options. Through this swapping, a user is enabled to alter the data structure of the electronic form while in a mode permitting entry of data into the electronic form.

Figure 2:
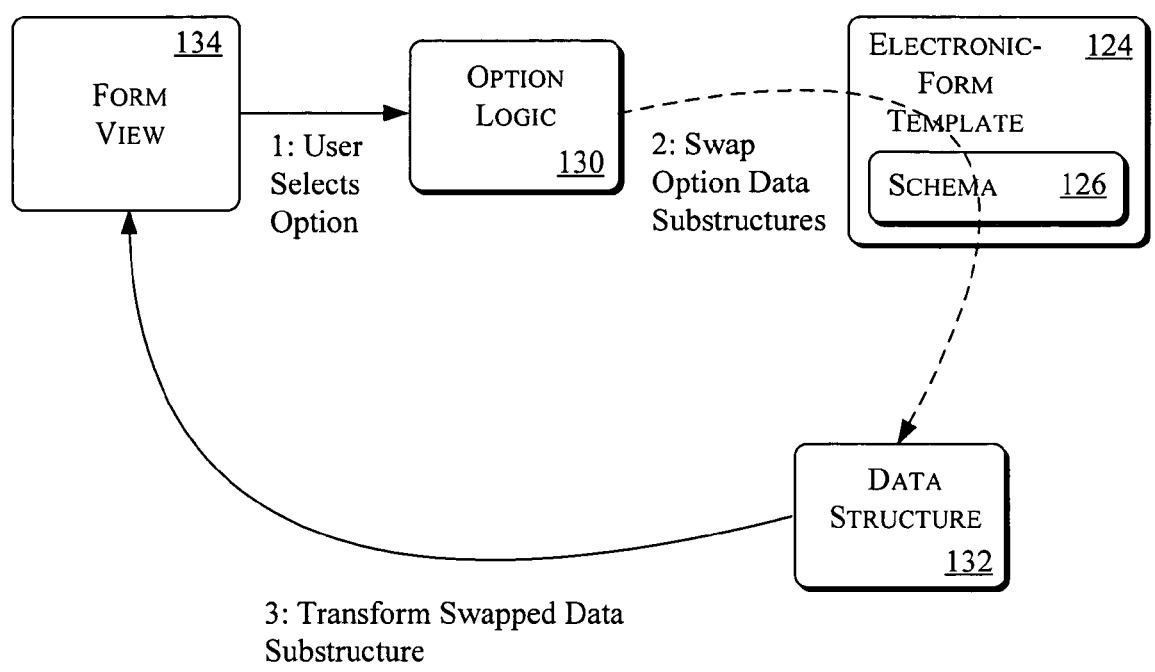
FIG. 2 sets forth an exemplary flow diagram showing interactions between components of the architecture of FIG. 1.

As an example of a user's interaction with this electronic form, consider FIG. 2. There an exemplary flow diagram showing interactions between a user and components of architecture 100 of FIG. 1 are shown. In this illustrated embodiment, a user is presented with form view 134, which is a transformation of electronic form 128's form data structure 132.

This form view is set forth in greater detail in FIG. 3, where a domestic address set of data-entry fields 302 is shown. This form is capable of accepting entry of information from a user into one of two mutually exclusive options. One of these options is shown with the domestic address fields. The other is not yet shown but can be represented by an international-address set of data-entry fields. Each of these mutually exclusive options map one-to-one with a data substructure capable of residing in the form's data structure 132. These data substructures may each separately be valid to schema 126, shown in FIG. 2.

The domestic address fields are, in this embodiment, an XSLT transformation into HTML of the data substructure of the domestic-address mutually exclusive option. These fields are shown exclusively because their corresponding data substructure is the only mutually exclusive option currently part of the form data structure. By having only one mutually exclusive option's data structure as part of the form data structure, the form data structure is valid to the electronic form's schema.

The user can begin entry of information into the domestic address fields, thereby passively selecting this mutually exclusive option rather than the international-address mutually exclusive option.

In the illustrated embodiment of FIG. 2, however, the user selects to swap the domestic-address mutually exclusive option with the international-address mutually exclusive option. This is marked as action 1, entitled "User Selects Option".

Figure 4:
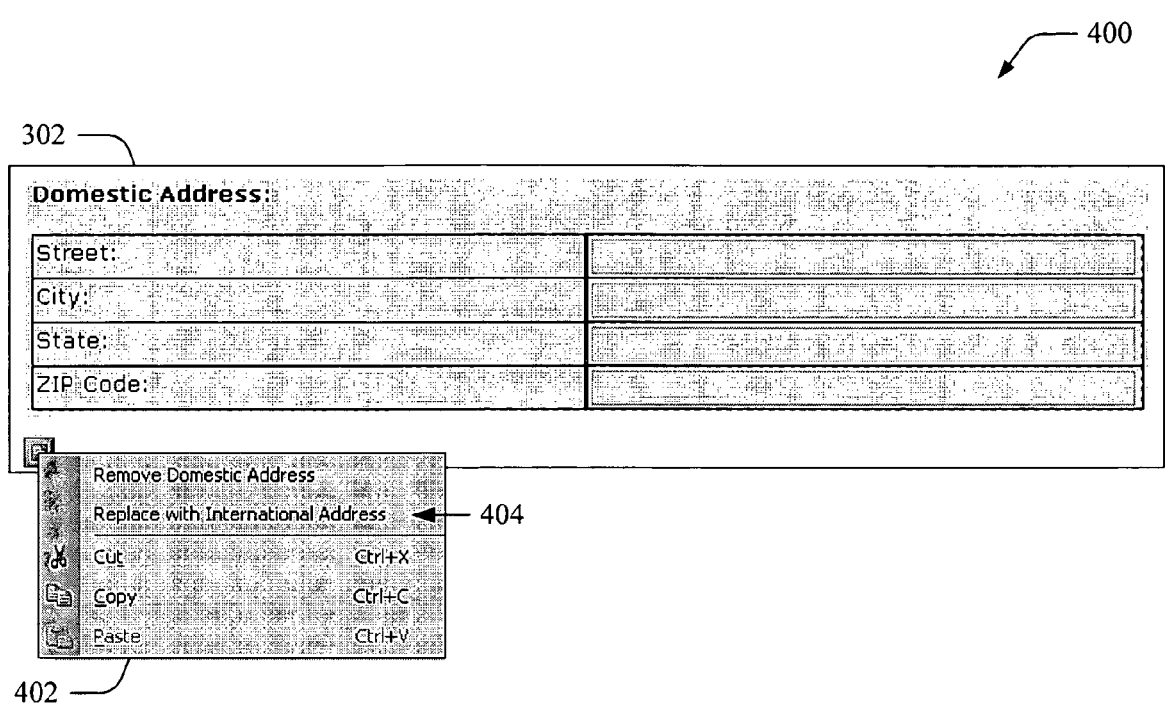
FIG. 4 illustrates a screen shot showing an exemplary option menu dialog.

This selection is shown visually in FIG. 4, which shows screen shot 400 and an option menu dialog 402. Through selecting an international-address option 404, the user selects that the domestic address option be swapped with the international address option. The menu dialog 402 describes the operation that will actually be performed; that of replacing the domestic address fields with the international address fields.

Responsive to the user's selection, option logic 130 of FIG. 2 swaps, as an atomic operation, the data substructure of the domestic-address mutually exclusive option with that of the international-address mutually exclusive option. In doing so, the option logic can communicate with the electronic form template and the schema to determine what is permitted by the schema, the precise syntax for the data structures, and the like. This swapping by the option logic is marked as action 2, entitled "Swap Option Data Substructure", and is shown with a dashed lined representing possible interaction with the electronic form template and the form's schema.

In the illustrated embodiment, the option logic atomically swaps the data substructure for one mutually exclusive option with the data substructure of another mutually exclusive option, rather than adding both and deleting one, or deleting both and adding one back in. The data substructures can be designed to map one-to-one with each mutually exclusive option, which enables one to be swapped with another in an atomic operation. In doing so, the electronic form remains valid to its schema. It does not have to transition through an invalid state. Another potential benefit of atomic swapping is that the user may not have to view the data-entry fields of all of the mutually exclusive options at once. This allows the form view to be less cluttered. Still another benefit of atomic swapping is that a user may be permitted only structurally valid interactions with the electronic form. This may reduce the probability of erroneous data being retained by the electronic form.

Following the swap of the data substructures, the change is reflected in the form view. This change can be reflected by transforming the new data substructure added to the form data structure (e.g., action 3, entitled "Transform Swapped Data Substructure" of FIG. 2) or transforming all of the form data structure, for instance. Also, responsive to this swap, the option menu dialog of FIG. 4 may show a corresponding new option, in this case for replacing the international-address fields with the domestic-address option (not shown).

Continuing the illustrated embodiment, the change to the form view is shown with the swapping of the domestic address set of data-entry fields with an international address set of data-entry fields 502 shown in FIG. 5. These fields enable a user to enter an international address into the electronic form without the form being invalid.

Building Mutually Exclusive Options

Figure 6:
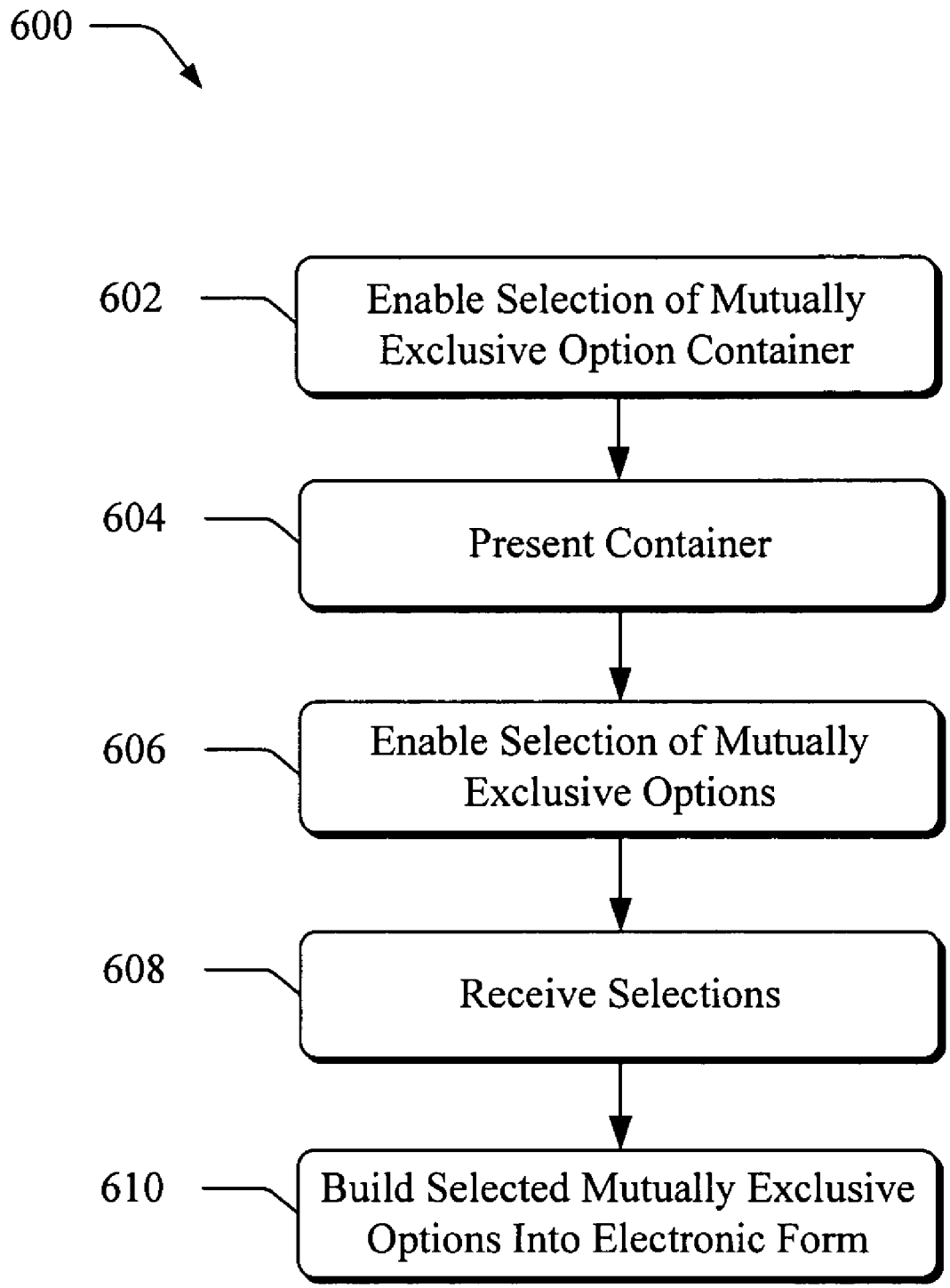
FIG. 6 sets forth a flow diagram of an exemplary process for building mutually exclusive options.

Referring to FIG. 6, an exemplary process 600 for building mutually exclusive options is shown. The process 600 is illustrated as a series of blocks representing individual operations or acts performed by components of architecture 100, such as design application 120 and/or its user interface 122. This and other processes described herein may be implemented in any suitable hardware, software, firmware, or combination thereof. In the case of software and firmware, these processes represent sets of operations implemented as computer-executable instructions.

At block 602, the design application enables selection of a mutually exclusive option container. This container can be chosen by dragging and dropping it from one region of display 102 to another, for instance. It can also be chosen through a dialog menu or in other appropriate ways. This mutually exclusive option container may contain one set of options or an arbitrarily large number of sets of the same two or more options. In cases where the container is chosen to have multiple repeating sets, an eventual user of the electronic form may be enabled to select how many times the sets repeat.

Responsive to receiving the selection, the design application presents the option container at block 604.

The design application also enables a user to select mutually exclusive options at block 606. In the ongoing embodiment, the design application does so through an area in the presented container into which a form designer may place selected mutually exclusive options. This area in the container provides an intuitive place in which a form designer can place his or her selections, such as by dragging and dropping graphics or icons (e.g., components, data-entry fields, and/or nodes) representing mutually exclusive options.

Figure 7:
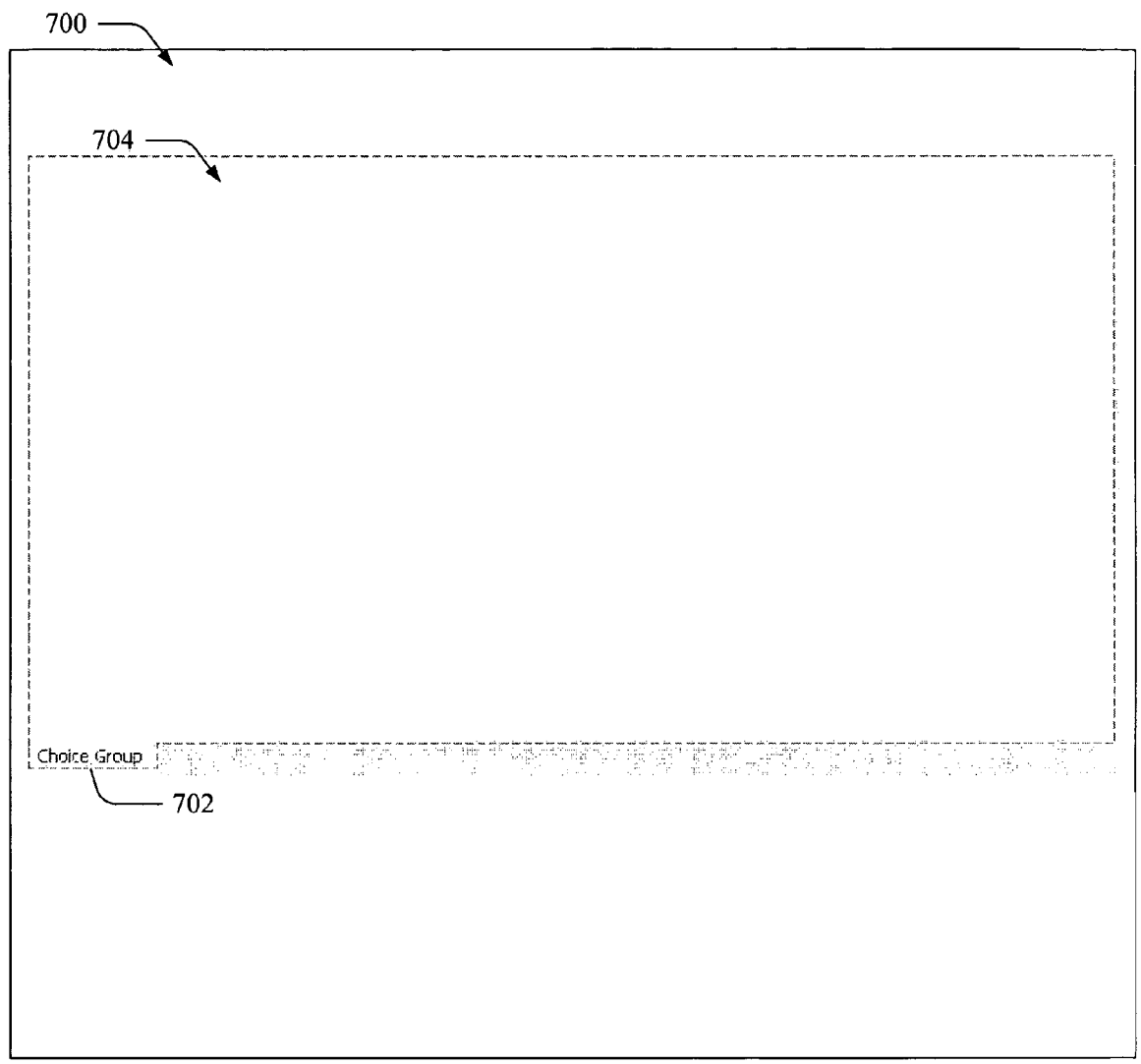
FIG. 7 illustrates an exemplary form-design area having an exemplary non-repeating container.

To illustrate the ongoing embodiment, a form-design area 700 having a non-repeating container 702 (labeled "Choice Group") is shown in FIG. 7. This non-repeating container comprises an option area 704 into which the form designer may graphically insert an option.

Returning to FIG. 6, a form designer selects options to be mutually exclusive, the selection of which is received by the design application at block 608. The form designer may be enabled to do so graphically by dragging and dropping mutually exclusive options, such as a domestic address option and an international address option, into the container. Alternatively or additionally, the form designer may be enabled to do so by dragging and dropping subcomponents into different areas in the container, the subcomponents dropped into each different area representing in sum a mutually exclusive option.

Referring to FIG. 8, the form-design area of FIG. 7 is updated to show a graphical selection of two options placed within option area 704 of non-repeating container 702. These options are a domestic address option 802 and an international address option 804. Each of these mutually exclusive options may be represented by data-entry fields mirroring how they will look to a user editing the electronic form or with other graphics or icons. See, for example, the domestic-address and international-address data-entry fields shown in FIGS. 3 and 5, respectively.

Responsive to these selections, the design application builds these mutually exclusive options into the electronic form at block 610. In so doing, the design application may generate information capable of instructing a runtime application in how to perform editing for the mutually exclusive options. Continuing the illustrated embodiment, the design application alters schema 126 to permit either of the mutually exclusive options chosen, but not both at once. To do so, the design application may add the following to the schema:

```
<xsd:element name="group1"
    <xsd:complextype>
        <xsd:choice >
    <xsd:element name="group2">
        <xsd:complexType>
            <xsd:sequence>
            </xsd:sequence>
        </xsd:complexType>
    </xsd:element>
    <xsd:element name="group3">
        <xsd:complexType>
            <xsd:sequence>
        </xsd:sequence>
        </xsd:complexType>
    </xsd:element>
        </xsd:choice>
    </xsd:complexType>
</xsd:element>
```

In this embodiment, "group1" represents the option container, "group2" the domestic-address option, and the "group3" the international-address option.

If, however, a form designer places a repeating mutually exclusive option container in the form-design area, the following can be added to the schema:

```
<xsd:element name="group1"
    <xsd:complextype>
        <xsd:choice maxOccurs="unbounded">
            <xsd:element name="group2">
                <xsd:complexType>
                    <xsd:sequence>
                    </xsd:sequence>
                </xsd:complexType>
            </xsd:element>
            <xsd:element name="group3">
                <xsd:complexType>
                    <xsd:sequence>
                    </xsd:sequence>
                </xsd:complexType>
            </xsd:element>
        </xsd:choice>
    </xsd:complexType>
</xsd:element>
```

Consider, for example, repeating mutually exclusive options for legs of a business trip. If a trip can have an arbitrary number of legs (some trips may involve a lot of travel and stops) each of which is mutually exclusive, repeating these options to an arbitrary length can be very useful to a user of an electronic form. Assume that a user wishes to enter her trip from Seattle to Spokane, then to Boise, and back again. If a form designer chose three mutually exclusive options for each leg to be in the electronic form, the form could have options of: air; car; and hotel. Thus, for a first leg, if each leg defaults to air travel, the user may simple enter her flight to Spokane. For the second leg, she may swap the air option for a hotel option and enter her stay in a Spokane hotel. For the next leg, she may swap the air option for a car rental and enter the rental company, car model and so forth. For the next leg, assume she stays in a Boise hotel and so swaps the air default for a hotel option. For the last leg, she flies back to Seattle and so enters her airline carrier and related details.

By enabling a form designer to build a repeating set of mutually exclusive options, the tools enable creation of an electronic form that permits a heterogeneous list of arbitrary length or as long as permitted by the schema. And, each entry of this list may be one of the set of mutually exclusive options. In the ongoing example, this list may comprise an air mutually exclusive option followed by a hotel mutually exclusive option, a car mutually exclusive option, another hotel mutually exclusive option, and another air mutually exclusive option. The form view of this list could show corresponding sets of data-entry fields for each mutually exclusive option in the list, thereby enabling the user to enter information for each leg of her trip.

Figure 9:
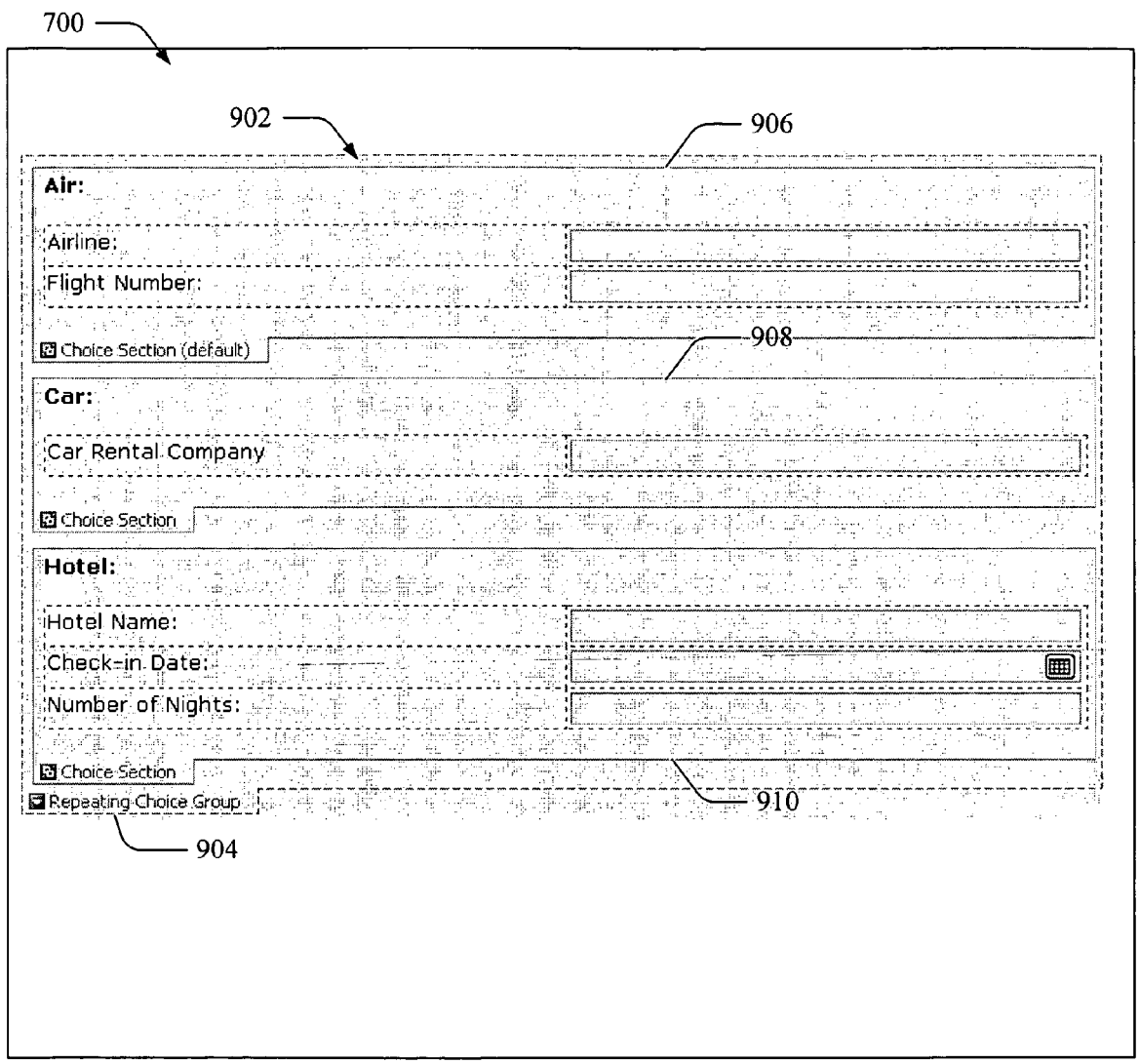
FIG. 9 illustrates the form-design area of FIG. 7 showing a graphical selection of three options placed within an option area of an exemplary repeating container.

The result of a form designer's graphical selection of this repeating set of mutually exclusive options is set forth in FIG. 9. There, the form-design area 700 shows a graphical selection of three options placed within option area 902 of repeating container 904 (labeled "Repeating Choice Group"). These options are an air travel mutually exclusive option 906, a car travel mutually exclusive option 908, and a hotel mutually exclusive option 910. Each of these mutually exclusive options may be represented by data-entry fields mirroring how they will look to a user editing the electronic form or with other graphics or icons.

CONCLUSION

The above-described systems and methods enable creation and/or use of an electronic form capable of allowing a user to select from mutually exclusive options without the electronic form being in an invalid state. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A system comprising:
    a computing device including one or more processing units;
    one or more computer-readable media having computer-readable instructions therein that, when executed by the one or more processing units, cause the one or more processing units to:
        enable a user to select from mutually exclusive options in an electronic form, the electronic form including eXtensible Markup Language (XML);
        responsive to a selection by the user of a first mutually exclusive option, enable interaction with the first mutually exclusive option while maintaining the electronic form's validity to a schema governing the electronic form;
    responsive to a selection of a second mutually exclusive option, perform an atomic operation effective to replace, in a data structure corresponding to at least a portion of the electronic form, a first data substructure corresponding to the first mutually exclusive option with a second data substructure corresponding to the second mutually exclusive option while the electronic form is in a mode permitting entry of data into one or more fillable fields of the electronic form; and
    perform a transformation of at least a portion of the data structure effective to enable interaction with the second mutually exclusive option while maintaining the electronic form's validity to the schema governing the electronic form.

2. The system of claim 1, wherein the computer-readable instructions, when executed by the one or more processing units, cause the one or more processing units to enable interaction by enabling entry of information into the selected mutually exclusive option.

3. The system of claim 1, wherein the mutually exclusive options are governed by the schema.

4. The system of claim 1, wherein the first mutually exclusive option and the second mutually exclusive option each correspond one-to-one with the first data substructure and the second data substructure, respectively.

5. A method comprising:
    receiving a selection of a plurality of mutually exclusive options displayed in a graphical user interface of a design application configured to enable design of an electronic form, the electronic form including eXtensible Markup Language (XML) and each of the plurality of mutually exclusive options being mutually exclusive with respect to each other; and
    causing the design application to build the plurality of mutually exclusive options into an electronic form effective to enable a runtime application to:
        permit data entry to a first mutually exclusive option among the plurality of mutually exclusive options without the electronic form transitioning through an invalid state;
        responsive to a selection of a second mutually exclusive option among the plurality of mutually exclusive options, perform an atomic operation effective to swap, in a data structure corresponding to at least a portion of the electronic form, a first data substructure corresponding to the first mutually exclusive option with a second data substructure corresponding to the second mutually exclusive option while the electronic form is in a mode permitting entry of data into one or more fillable fields of the electronic form; and perform a transformation of at least a portion of the data structure effective to permit data entry to the second mutually exclusive option without the electronic form transitioning through an invalid state.

6. The method of claim 5, wherein the design application is further configured to enable the runtime application to permit data entry to data substructures corresponding to each of the plurality of mutually exclusive options.

7. The method of claim 5, wherein the first mutually exclusive option and the second mutually exclusive option each maps one-to-one with the first data substructure and the second data substructure, respectively; and wherein the design application is further configured to enable the data structure to include only one of the first data substructure or the second data substructure at a given time.

8. The method of claim 5, further comprising causing the design application to build the plurality of mutually exclusive options into the electronic form by adding eXtensible Markup Language (XML) to a schema governing the electronic form.

9. A method comprising:

presenting an electronic form having a plurality of mutually exclusive options, the electronic form including eXtensible Markup Language (XML);

presenting a graphical user interface associated with the electronic form, the graphical user interface including an option menu configured to enable selection from among the plurality of mutually exclusive options, each of the plurality of mutually exclusive options including one or more fillable fields configured to receive data entry;

receiving a selection of a first mutually exclusive option from the option menu;

enabling data entry into one or more fillable fields associated with the first mutually exclusive option;

receiving a selection of a second mutually exclusive option from the option menu;

performing an atomic operation effective to swap, in a data structure corresponding to at least a portion of the electronic form, a first data substructure that corresponds to the first mutually exclusive option for a second data substructure that corresponds to the second mutually exclusive option while the electronic form is in a mode permitting entry of data into one or more fillable fields of the electronic form; and performing a transformation of at least a portion of the data structure effective to enable data entry into fillable fields associated with the second mutually exclusive option while the electronic form is valid to a schema governing the electronic form.

10. The method of claim 9, further comprising performing the transformation of the at least a portion of the data structure by transforming, with an eXtensible Stylesheet Language Transformation (XSLT), the at least a portion of the data structure, wherein the data structure comprises eXtensible Markup Language.

11. The method of claim 9, wherein the option menu describes an operation of swapping one mutually exclusive option with another.

12. The method of claim 9, wherein the first mutually exclusive option and the second mutually exclusive option each maps one-to-one with the first data substructure and the second data substructure, respectively.

13. The method of claim 9, wherein the data substructure corresponding to a selected mutually exclusive option is present in the data structure of the electronic form but no other data substructures corresponding to unselected mutually exclusive options are present in the data structure.

14. A method comprising:

presenting to a user an electronic form including eXtensible Markup Language (XML) and having repeating sets of mutually exclusive options, a first set of the repeating sets including a first mutually exclusive option that is mutually exclusive with respect to a second mutually exclusive option of a second set of the repeating sets;

presenting to the user a graphical user interface associated with and separate from the electronic form, the graphical user interface enabling selection of one of the mutually exclusive options for each of the repeating sets while the electronic form is in a mode permitting entry of data into one or more fillable fields of the electronic form;

enabling the user, responsive to receiving selections of mutually exclusive options from the graphical user interface, to enter information into fillable fields associated with the selected mutually exclusive option for each of the repeating sets while the electronic form is valid to a schema governing the electronic form;

responsive to an indication that one of the selections of the mutually exclusive options has been changed from a first mutually exclusive option to a second mutually exclusive option, perform an atomic operation effective to replace, in a data structure corresponding to at least a portion of the electronic form, a first data substructure corresponding to the first mutually exclusive option with a second data substructure corresponding to the second mutually exclusive option while the electronic form is in a mode permitting entry of data into one or more fillable fields of the electronic form; and performing a transformation of at least a portion of the data structure effective to enable the user to enter information into fillable fields associated with the second mutually exclusive option while the electronic form is valid to the schema governing the electronic form.

15. The method of claim 14, wherein the repeating sets have an arbitrary number of sets.

16. The method of claim 15, wherein the arbitrary number of sets is determined, responsive to receiving the selections, based on a number of selections received.

* * * * *